US009840762B2

(12) United States Patent
Redford et al.

(10) Patent No.: US 9,840,762 B2
(45) Date of Patent: *Dec. 12, 2017

(54) PROCESS FOR THE SURFACE MODIFICATION OF A POLYMER PARTICLE (75) Inventors: Keith Redford, Hagan (NO); Ionel Halaciuga, Providence, RI (US); Dan V. Goia, Potsdam, NY (US); Cathrine Braein Nilsen, Oslo (NO)

(73) Assignee: Conpart AS, Skjetten (NO)

(*) Notice: Subject to any disclaimer, the term of this patent is extended or adjusted under 35 U.S.C. 154(b) by 0 days.

This patent is subject to a terminal disclaimer.

(21) Appl. No.: 13/882,377

(22) PCT Filed: Oct. 28, 2011

(86) PCT No.: PCT/GB2011/052101
§ 371 (c)(1),
(2), (4) Date: Jul. 10, 2013

(87) PCT Pub. No.: WO2012/056244
PCT Pub. Date: May 3, 2012

(65) Prior Publication Data
US 2013/0277623 A1 Oct. 24, 2013

(30) Foreign Application Priority Data
Oct. 29, 2010 (GB) .................... 1018380.4

(51) Int. Cl.
*H01B 1/02* (2006.01)
*C23C 2/02* (2006.01)
(Continued)

(52) U.S. Cl.
CPC ....... *C23C 2/02* (2013.01); *C08J 7/06* (2013.01); *C08K 3/08* (2013.01); *C08K 5/17* (2013.01);
(Continued)

(58) Field of Classification Search
CPC ....... H01L 2924/00; H01L 2224/73265; H01L 2224/48227; H01L 2224/45147; H01L 2224/48247; H01B 1/02
(Continued)

(56) References Cited

U.S. PATENT DOCUMENTS 4,061,802 A * 12/1977 Costello .................. 427/304
4,336,173 A    6/1982 Ugelstad
(Continued)

FOREIGN PATENT DOCUMENTS

EP    0265212    4/1988
EP    1135777 A1    9/2001
(Continued)

OTHER PUBLICATIONS

International Search Report and Written Opinion, dated Dec. 28, 2011. 11 pages.
(Continued)

*Primary Examiner* — William Young
(74) *Attorney, Agent, or Firm* — Meunier Carlin & Curfman LLC (57) ABSTRACT A process for the preparation of an activated polymer particle comprising contacting a polymer particle with at least one polyamine, wherein said polyamine has three or more amino groups, to form a surface treated polymer particle; and applying a catalyst to the surface treated polymer particle to form an activated polymer particle. In some examples, the process can further comprise applying a metal coating to said activated polymer particle to form a metal coated polymer particle.

10 Claims, 8 Drawing Sheets

FESEM images of Nickel coated polymer particles: (a) not conditioned with amine; conditioned for 22 hours with (b) EDA, (c) DETA, (d) TETA and (e) TEPA; and (f) conditioned for 96 hours with TEPA (Note: the nominal diameter of the polymer spheres is 3.8 μm).

(51) Int. Cl.

| | |
|---|---|
| *C08J 7/06* | (2006.01) |
| *C08K 3/08* | (2006.01) |
| *C09J 9/02* | (2006.01) |
| *C09J 11/08* | (2006.01) |
| *C08K 5/17* | (2006.01) |
| *C08K 9/02* | (2006.01) |
| *C08J 3/12* | (2006.01) |

(52) U.S. Cl.
CPC ............... *C09J 9/02* (2013.01); *C09J 11/08* (2013.01); *C08J 3/128* (2013.01); *C08K 9/02* (2013.01); *H01B 1/02* (2013.01)

(58) Field of Classification Search
USPC ........................................................ 252/512
See application file for complete search history.

(56) References Cited

U.S. PATENT DOCUMENTS

| | | | |
|---|---|---|---|
| 4,459,378 A | 7/1984 | Ugelstad | |
| 4,588,617 A * | 5/1986 | Oka | ............................. 427/443.1 |
| 4,740,657 A | 4/1988 | Tsukagoshi | |
| 4,980,410 A | 12/1990 | Fryd et al. | |
| 5,866,202 A | 2/1999 | Nastke et al. | |
| 6,562,217 B1 | 5/2003 | Tanaka et al. | |
| 6,787,233 B1 * | 9/2004 | Molteberg et al. | ........... 428/403 |
| 6,906,427 B2 | 6/2005 | Tanaka et al. | |
| 2005/0014001 A1 | 1/2005 | Fonnum et al. | |
| 2006/0035036 A1 | 2/2006 | Yim et al. | |
| 2007/0063347 A1 | 3/2007 | Su | |
| 2007/0092698 A1 | 4/2007 | Ishida et al. | |
| 2007/0202335 A1 | 8/2007 | Kubota | |
| 2008/0078977 A1 * | 4/2008 | Hashiba et al. | .............. 252/500 |
| 2008/0102277 A1 * | 5/2008 | Bae et al. | ..................... 428/403 |
| 2008/0187755 A1 | 8/2008 | Herfert et al. | |
| 2009/0291506 A1 | 11/2009 | Fonnum et al. | |
| 2010/0063469 A1 | 3/2010 | Herfert | |
| 2011/0297313 A1 * | 12/2011 | Samuels | ................... B32B 7/10 |
| | | | 156/285 |
| 2012/0237447 A1 | 9/2012 | Lee et al. | |
| 2012/0279781 A1 | 11/2012 | Ozeki et al. | |

FOREIGN PATENT DOCUMENTS

| | | | |
|---|---|---|---|
| EP | 2154182 | | 2/2010 |
| JP | 61064882 | * | 4/1986 |
| JP | 61026629 | | 5/1986 |
| JP | 61026630 | | 5/1986 |
| JP | 0519241 | | 3/1993 |
| JP | 06033248 | | 8/1994 |
| WO | 9302112 | | 2/1993 |
| WO | 9701866 | | 1/1997 |
| WO | 0024005 | | 4/2000 |
| WO | 0061647 | | 10/2000 |
| WO | 2006059825 | | 6/2006 |

OTHER PUBLICATIONS

Loeffler, Mario, "Polymer-Core Solder Balls: An Alternative to Solid Solder Balls?", 4 pages, May 23, 2006.
International Search Report and Written Opinion dated Jan. 31, 2012. 12 pages.
Mijovic et al. "Reaction Kinetics of Epoxy/Amine Model Systems. The Effects of Electrophilicity of Amine Molecule". Macromolecules, 27, pp. 7589-7600. 1994.
Office Action, dated May 20, 2015, recieved in corresponding U.S. Appl. No. 13/882,416.
Miscellaneous Action, dated Jun. 1, 2015, received in corresponding U.S. Appl. No. 13/882,416 providing translation of JP0517241.

* cited by examiner

Figure 1. FESEM images of Nickel coated polymer particles: (a) not conditioned with amine; conditioned for 22 hours with (b) EDA, (c) DETA, (d) TETA and (e) TEPA; and (f) conditioned for 96 hours with TEPA (Note: the nominal diameter of the polymer spheres is 3.8 μm).

Figure 2. a) TEM image of Pd coated polymer particles conditioned in EDA for 22 hrs (the inset shows the image of a large Pd cluster), b) high magnification FESEM of the surface of a polymer particle shown in (a) coated with nickel, c) TEM image of a Pd coated polymer sphere conditioned in TEPA for 96 hours, and d) FESEM of a polymer particle shown in (c) coated with nickel. (Note: Nominal diameter of the polymer spheres is 3.8 μm).

Figure 3. X-ray diffraction pattern obtained for the Nickel coated particles obtained with prolonged TEPA treatment (Experiment A6, Table 1).

Figure 4. Scanning electron micrograph of a portion of the fractured dislocated Nickel shell. The nominal diameter of the polymer spheres is 3.8 μm, and the thickness of the nickel layer (~40 nm), is in agreement with the amount of Ni deposited (Sample 5, Table 2).

Figure 5. Particle size of input polymer particles (black line) and Ni coated particles (red line).

Figure 6. Scanning electron micrograph of Nickel coated polymer particles with a nominal diameter of 3.0 μm. Inset shows high magnification of the surface of a single coated particle.

Figure 7. Electron micrograph of Nickel coated polymer particle with 40% GMA content. Inset shows high magnification of the surface of a single particle.

Figure 8. FE-SEM images obtained using different $NH_3$:Ni molar ratios: (a) 2:1; (b) 2.5:1; (c) 3.5:1; and (d) 6:1 (Samples 1-4, Table 2) (Note: the nominal diameter of the polymer spheres is 3.8 μm).

Figure 9. FE-SEM images of Nickel coated polymer particles with a varying Ni layer thickness: a) 40 nm, b) 80 nm c) 100 nm, and d) 120 nm (Samples 5-8, Table 2) (Note: the nominal diameter of the polymer spheres is 3.8 μm).

PROCESS FOR THE SURFACE MODIFICATION OF A POLYMER PARTICLE

FIELD

The present invention relates to a process for the surface preparation of particles, allowing production of improved conductive polymer particles suitable for use in electronics applications. In particular, the invention relates to the surface preparation of polymer particles by treatment with a polyamine, an improved process for the binding of the catalyst and subsequently metal coated polymer particles comprising this treatment, and the improved, coated polymer particles produced using this process.

BACKGROUND

Miniaturization and robustness are key factors in today's electronics industry when considering manufacturing complex devices. Anisotropic conductive adhesives (ACA) and Anisotropic conductive films (ACF) that pass electricity along only one axis provide electrical connection in many critical electronic systems. This approach can replace traditional methods, like soldering, and provides connectivity where conventional technologies fail. ACA/ACF also facilitate a more efficient use of the board 'real estate' as well as more flexible and reliable interconnects. Typical ACA pastes contain electrically conductive metallic particles, ranging in size from 2 to 10 micrometers, incorporated in an insulating binder. Larger particles are used in applications such as Ball Grid Arrays (BGA) and Chip Scale Packaging (CSP). Typically, BGA/CSP applications require a particle having a diameter in the range of 100 μm to 1 mm.

When used as conductive fillers, metal coated polymer spheres offer a lower consumption of metal and a larger bonding surface due to their deformability. The deposited metallic shell consists typically of an inner Ni layer and an outer Au layer. The former represents a cost effective electrical conductor while the latter enhances electrical conductivity and corrosion resistance. See for example, US2006/035036A1.

The successful deposition of metals, for example Ni, on polymer substrates requires an effective surface activation, as discussed in US2007/0092698A1 and US2007/0202335A1. Despite numerous attempts to develop viable alternatives, the $Sn^{2+}/Pd^{2+}$ system remains the most widely used approach to activate polymeric surfaces. For example, see US2007/0063347A1.

After successful activation, the Ni coating is deposited typically through an electroless plating process. This step makes possible the deposition of continuous nickel layers onto polymer spheres of various sizes and surface composition. The uniformity, continuity, and compactness of the metallic shell are essential in preventing catastrophic mechanical failures while the ability to tailor the composition of the polymer core/surface provides materials with a broader range of mechanical properties. The current inventors have developed a process which provides metal coated polymer spheres suitable for electronics and particularly ACA applications. To be used in such applications, particles need to be coated with a conductive material and there is a need for improvements in the surface adhesion of the polymer core particles to any conductive material in order to prevent delamination and to ensure uniform plating and fewer surface defects in the final particles.

The process of the invention provides a method for activating the surface of polymer spheres of different size, composition, and surface functionality, which can be followed by metal plating.

The inventors have realised that treatment of polymer particles with polyamines before activation improves surface adhesion and provides a much better surface for activation and hence coating. The particles treated according to the process of the current invention have an improved surface for activation and hence prevent delamination of the eventual coating from the particle surface.

In EP-A-2154182, an aromatic polyester film is surface modified by contact with an amine terminated polyamine. An amide linkage is formed as the amine breaks ester linkages in the polymer backbone.

The actual polymer particle treated with polyamine is not itself new. WO 93/02112 and WO 00/61647 describe the production of polymer particles suitable for use here. The present inventors have realised that surface treatment of such particles or others provides a surface ideal for activation and subsequent coating upon.

U.S. Pat. No. 6,787,233 describes gold coated styrene polymer particles. The particles are formed by palladination of an activated polymer surface. Activation of the polymer surface can be achieved using ethylene diamine. As we note below, the use of diamines does not provide a surface which is well-suited to activation. It is highly surprising that the use of polyamines provides a much improved surface treated particle.

SUMMARY OF INVENTION

Viewed from one aspect the invention provides a process for the preparation of an activated polymer particle comprising contacting a polymer particle with at least one polyamine, wherein said polyamine has three or more amino groups, to form a surface treated polymer particle; and
applying a catalyst to the surface treated polymer particle to form an activated polymer particle.

Viewed from another aspect the invention further comprises applying a metal coating to said activated polymer particle to form a metal coated polymer particle.

Viewed from another aspect the invention provides a metal coated particle obtainable by a process as hereinbefore defined.

Viewed from another aspect the invention provides an activated polymer particle obtainable by a process as hereinbefore defined.

Viewed from another aspect the invention provides an anisotropic conductive adhesive (ACA) or anisotropic conductive film (ACF) and/or an electronic circuit part comprising a metal coated polymer particle of the invention.

The invention also provides the use of a metal coated polymer particle as hereinbefore defined in an electronic part.

DEFINITIONS

A surface treated polymer particle is a polymer particle that has been treated with a polyamine compound as described herein.

An activated polymer particle is one which has been treated with a polyamine and subsequently a catalyst has been applied as described herein.

The term catalyst is used to define a material which is capable of catalysing the metal coating application step.

A metal coated polymer particle is an activated particle onto which has been applied a metal coating.

DETAILED DESCRIPTION OF THE INVENTION

The inventors have found that the surface treatment of a polymer particle with a polyamine provides an ideal surface for subsequent contact with a catalyst. The polyamine treatment allows a superior distribution of catalyst to form on the polymer particle surface compared with particles treated with diaminated compounds or compared with particles which have not been surface treated at all. Without wishing to be limited by theory, it is believed that due to the increased number of available amine groups, which also have improved mobility, the catalyst, typically Pd, is able to bind to the particles in a uniform manner with short distances between the catalyst atom clusters. Thus, when followed by a metal coating step this in turn produces a superior coated particle.

The actual polymer particle contacted with the polyamine is not itself new. Polymer particles which can be used in this invention can be made following the teaching of, inter alia, WO93/02112 and WO 00/61647. In general, polymer particles based on styrenics, acrylates, urethanes, epoxides or phenolics can be used here. Moreover, suitable starting polymer particles are commercially available from suppliers such a Conpart AS, Norway.

The polymer particle preferably does not contain a polyester. The polymer particle preferably does not contain an aromatic polyester. The term polyester is used herein to define a polymer in which an ester linkage is present in the backbone of the polymer as opposed to a side chain thereof. An aromatic polyester is one in which the backbone of the polymer contains both repeating ester linkages and an aromatic group such as a phenyl or naphthyl ring in the backbone chain.

It is further preferred if the polymer particle does not comprise a linear polyester, i.e. one in which there are no side chains branching off the main polyester backbone.

The polymer particles of use in the invention are typically formed from a core particle which can be manufactured by known techniques such as emulsion polymerisation, dispersion polymerisation and suspension polymerisation from a seed particle. These techniques are well known in the art. It is especially preferred if an Ugelstad activated swelling technique is employed to manufacture the core particles. The Ugelstad process is an "activated swelling" process rather than a suspension polymerization because polymerization is only initiated after all the monomer has been absorbed into the starting polymer seeds. In a seeded suspension polymerization the growing seed is continuously contacted with fresh monomer and initiator.

The Ugelstad (Sintef) process is described in U.S. Pat. No. 4,336,173 and U.S. Pat. No. 4,459,378 although particles can also simply be bought from suppliers. Monodisperse polymer particles produced by the Sintef process are sold commercially under the trade name Dynospheres®, typically with mode particle sizes in the range 2 to 60 µm. It is preferred if the particles used in this invention are monodisperse.

In general therefore, this technology is well known and particles can be purchased commercially from the likes of Invitrogen Dynal ASA.

The core particles can be formed from a variety of different monomers. It will be preferred if the particle is also cross-linked. Typically, most of the monomers used will be monofunctional vinyl monomers, and crosslinking of the particles is obtained by using a polyfunctional vinyl monomer.

Another option is particles prepared from acrylic acid esters, methacrylic acid esters, acrylic acids, methacrylic acids, acrylonitrile, methacrylonitrile, vinyl chloride, vinyl acetate and vinyl propionate. Mixtures of any of these monomers can also be used optionally together with the styrene monomers above.

Seed particles may, for example, be prepared from styrene, e.g. styrene crosslinked with divinylbenzene or acrylates. Other styrene monomers of use in the invention include methylstyrene and vinyl toluene. Mixtures of styrene monomers may be used. All monomers can be cross-linked with divinylbenzene or acrylic esters of difunctional alcohols such as ethanedioldiacrylate. Some particles may require treatment with base to hydrolyse ester groups to allow cross-linking. The use of a cross-linked polymer particle is preferred.

Some monomers may comprise epoxy groups such as glycidyl methacrylate. The skilled man is able to select the monomer combination and cross-linker he wants using his general knowledge.

Preferred polymer particles according to the invention comprise a styrene, an acrylate or a methacrylate seed. Highly preferred monomers therefore include acrylic acid, butyl acrylate, 2-ethylhexyl acrylate, methyl acrylate, ethyl acrylate, acrylonitrile, methyl methacrylate and trimethylolpropane triacrylate (TMPTA). Preferred crosslinkers include diacrylates and methacrylates of ethylene glycol, propylene glycol, $C_4$ diols, $C_5$ diols and $C_6$ diols. For example hexanedioldiacrylate is particularly preferred.

Functionalised monomers of interest include mono or multiply ethylenically unsaturated monomers such as acrylic acid esters, methacrylate esters, acrylic acid, methacrylic acid, acrylonitrile, methacrylonitrile and vinyl propionate.

The use of acrylic and methacrylic acids and esters thereof is especially preferred. Such compounds include methyl, ethyl, propyl, butyl, or glycidyl acrylic acid esters and methyl, ethyl, propyl, butyl, or glycidyl methacrylates.

In a preferred embodiment, a seed polymer particle may be produced that can be swollen by an ionisable liquid. It is highly preferred if this seed polymer particle is functionalised. By functionalised is meant that an ionisable group is introduced into the polymer seed. This ionisable group may be present as part of the monomer used to form the seed or it may be introduced by post treatment of the seed.

Thus, ionisable groups may be introduced through the monomer used for seed preparation, and if necessary these groups may be temporarily protected during seed formation. The use of esters for example allows the formation of carboxylic acids upon ester hydrolysis. The use of acrylic acids provides an ionisable carboxyl group in the polymer seed.

Alternatively, a seed particle can be contacted with an external agent such as acid or a base to introduce ionisable groups. Suitable external agents include phosphoric acid or sulphuric acid.

Suitable ionisable groups include acid groups such as sulphonic acid groups, phosphonic acid groups or carboxylic acid groups.

The introduction of an ionisable group provides a hydrophilic environment making seeds water swellable and also able to absorb the monomers discussed below. Moreover, these groups serve to catalyst the polymerisation of the aromatic compound and aldehyde monomer within the polymer seed as described below.

The polymer seeds, preferably functionalised polymer seeds, may then be swollen with monomers and those monomers polymerized within the seed so as to form the polymer particles of the invention which are then suitable for surface treatment and activation. In general, the amine reaction discussed herein takes place between the amine and the polymer formed during polymerisation of the monomers swelled into the polymer seed. The seed particle is not generally exposed to the aminating compound.

Suitable polymer particles comprise a seed swelled with an aromatic alcohol/aldehyde blend such as a phenol/formaldehyde, or seed swelled with an aromatic amine/aldehyde blend such as melamine/formaldehyde and wherein the monomers are polymerised within the seed. The use of monomers containing ester groups, epoxy groups and acid groups is also contemplated. For example, the use of an epoxy monomer such as glycidyl methacrylate is envisaged. Epoxy monomers are those containing an epoxide group in the side chain of the monomer. Ester monomers of interest are those containing an ester group in the side chain of the polymer such as acrylates. Acid groups of interest are those containing acid groups in the side chain of the monomer such as acrylic acids.

It is preferred if the monomers used during swelling do not form a polyester, in particular a linear polyester or aromatic polyester.

In particular, the functionalised monomer present may be one which is capable of undergoing reaction with a polyamine without causing chain scission. It will be preferred therefore if the polymer particle is free of amino groups (before polyamine group treatment) as these groups will not react as easily with a polyamine.

For polymer particles which are already aminated (before polyamine group treatment) it is possible to transaminate to form a polyaminated particle. Transamination may be by means of heat treatment and exchange. The lighter amine or diamine may be removed by evaporation and replaced with polyamine.

Further reactive monomers of interest include furfurylalcohol, furfural, furfurylalcohol-formaldehyde, phenol-furfural, phenol-furfuryl-alcohol, resorcinol formaldehyde, cresol-formaldehyde, phenol-formaldehyde, urea-formaldehyde, melamine-formaldehyde, epoxy compounds, epoxy-amine compounds and diisocyanate-polyhydroxy compound systems.

The aldehyde of use in the invention is preferably a $C_{1-6}$ alkanal, or furfural, especially a $C_{1-4}$-alkanal. The seed is preferably swelled with an aromatic alcohol compound in combination with a formaldehyde or with an aromatic amine compound in combination with formaldehyde.

The term aromatic is used herein to cover either an aryl compound or heteroaryl compound containing at least one heteroatom selected from N, O or S. It is preferred if the aromatic group is 5 or 6-membered in the ring. Preferred aryl groups include $C_{6-10}$ aryl groups, especially those containing a benzene ring.

Any aromatic alcohol can have one or more hydroxyl groups, e.g. 1 to 3, especially 1 or 2 hydroxyl groups directly bound to the aromatic ring. Any aromatic amine can have one or more amino groups, e.g. 1 to 3, especially 1 or 2 amino groups.

The aryl alcohol compound can contain one or more hydroxyl groups, especially two or more hydroxyl groups. Suitable aryl alcohols include phenol, resorcinol and cresol.

Preferred aryl amine compounds include aniline or diaminobenzene.

Heteroaryl groups of particular interest include 5 or 6 membered nitrogen heterocycles or 5 or 6 membered oxygen heterocycles. Suitable heteroaryl alcohols include furfuryl. Preferred heteroaryl amine compounds are melamine. Most preferably the seed particles contain resorcinol formaldehyde polymers or epoxy functionalised polymers.

Once swollen with these compounds, a polymerisation is effected within the seed particle which results in the seed swelling much more. The volume of the seed particle typically increases by many times. The polymerisation reaction is achieved simply by heating the particle. The temperature employed is typically around 60 to 80° C. As noted above however, the ionisable groups within the seed help catalyst this polymerisation process.

It will be appreciated therefore that the monomers will react with each other to form a polymer and hence what is contained within the particle is really a polymer thereof (there may of course be some unreacted monomer too).

It is highly preferred if an acrylate or methacrylate seed particle is employed, the ionisable groups present are sulphonic acids groups and a resorcinol formaldehyde or melamine formaldehyde polymer is swelled in the seed.

It is also highly preferred if a styrene/divinyl benzene seed particle is employed, the ionisable groups present are sulphonic acids groups and a resorcinol formaldehyde or melamine formaldehyde polymer is swelled in the seed.

These polymer core particles are described in WO93/02112 which is herein incorporated by reference.

When the amine reacts with a polymer particle as described herein, it is preferred if the reaction takes place through reaction of the amine with a group present as a side chain on any polymer forming part of the particle. If the amine reacts with, for example, an ester linkage which forms part of the backbone of a polymer unit, that polymer is broken. This damage to the polymer backbone can cause surface defects in a polymer particle and is not favoured. Surface defects are particularly critical for particles used in ACF as they can induce premature mechanical failure.

It is also preferred if the amine reacts with an epoxy group on the particle which will be part of a side chain from a polymer backbone. The amine group will ring open the epoxide to form the link between the particle and the amine. This reaction does not yield an amide linkage. In general, it is preferred if the amine does not form an amide linkage with the polymer particle. In particular, the amine should not form an amide bond with an ester group which forms part of the polymer backbone. It is highly preferred therefore if the polymer particle contains a reactive epoxy functionality.

It is however possible for the amine to react with an ester side chain. Unlike the situation where an ester group forms part of the backbone of a polymer, forming a link with a side chain ester does not cause polymer backbone chain damage and does not therefore cause potential for surface defects.

There are benefits in terms of polymer integrity if ester side chains react with amines as opposed to ester groups present in the backbone of the polymer.

One of the advantages of the invention is the uniformity in particle size. Our particles are monodisperse. By monodisperse is meant that for a plurality of particles (e.g. at least 100, more preferably at least 1000) the particles have a coefficient of variation (CV) of less than 20%, for example less than 15%, preferably less than 12%, more preferably less than 11%, still more preferably less than 10% and most preferably no more than about 8%. Ideally CV should be less than 5%, especially less than 2.5%. CV is determined in percentage as $$CV = \frac{100 \times \text{standard deviation}}{\text{mean}}$$

where mean is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90%, or more preferably about 95%, of total particle number (of detectable particles that is). Such a determination of CV is performable on a Coulter LS 130 particle size analyzer.

Suitable polymer particles may have a diameter in the range of 1 to 1000 µm, 2 to 500 µm, or 5-250 µm. Particles of differing diameters are available from various suppliers.

The use of a cross-linked polymer particle is preferred. The use of an acrylate containing polymer particle is preferred. The use of polymer particle containing glycidyl methacrylate (GMA) is especially preferred.

Heat Treatment

It is within the scope of the invention for the polymer core particles to be heat treated. The present inventors have surprisingly found that by heat-treating these polymer core particles, the mechanical properties of the particle are improved. In particular, improvements in thermal expansion coefficient, elastic modulus and deformation before fracture can be achieved.

The polymer core particles may be heat treated by heating to a temperature above 150° C., e.g. at least 180° C. Preferably the heat treatment temperature is in the range 150 to 400° C., such as 160° C. to 350° C., more preferably 175 to 300° C., such as 180 to 250° C. The heat treatment step can be carried out in an inert atmosphere, especially if heat treatment takes place at a temperature of more than 250° C., but is preferably conducted in air. The heat treatment step can be very short, as the benefits of the invention are believed to be felt rapidly. The dwell time at the high temperature may last for as little as 1 second. It will be important of course, to ensure that when heating a plurality of particles that these are all exposed to the necessary heat.

This heat treatment step can also be effected after the polyamination step.

Polyamination

In the process of the invention, a polymer particle is contacted with a polyamine compound in order to provide a polymer particle surface with better adhesion for coating. The term polyamine is used herein to designate an amine having at least three amine units. It does not cover the presence of two amine units. The use of a mixture of polyamines is also possible. It is also possible to use a mixture of a polyamine and a non polyamine (e.g. a diamine) although preferably the polyamine will be present in higher amount.

Preferably, the polyamine is contacted with the polymer particle for a period of at least 15 minutes, e.g. 1 to 96 hours. Preferred durations include 0.25 to 24 hours, more preferably 0.5 to 12 hours.

The inventors have found that extending the contact time of the polymer particles with the polyamine tends to improve the compactness and smoothness of the metallic layer eventually formed.

Preferably the polyamine is contacted with said polymer particle at elevated temperature, e.g. at least 40° C., preferably in the temperature range 80-140° C.

Polyamine compounds of use in the process of the invention preferably have three or more amine groups, for example 3 to 10 amine groups such as 3-8 amino groups, preferably 3 to 6 amino groups, more preferably 4-5 amino groups. Preferred polyamines are alkyl amines. In particular, preferred polyamines are those containing up to 10 carbon atoms and up to 6 amino groups. Amino groups can be pendant or within the compound backbone. Preferred amines have amino groups in the backbone of the molecule. Amino groups are preferably primary or secondary.

The polyamine compound may be linear, branched or cyclic. It is especially preferred if the polyamine is linear and most especially it is a linear alkyl polyamine.

The use of diethylene triamine, triethylenetetramine or tetraethylene pentamine is preferred. Mixtures can also be employed.

The use of tris(2-aminoethyl)amine (CAS: 4097-89-6) is preferred.

The polyamine is conveniently provided in solution, typically with a polar solvent such as an aqueous solution or ethylene glycol solution or mixture thereof. For example, a water, ethylene glycol mixture can be used. The relative amounts of these components can vary but preferably values of 1:10 to 10:1 wt %, preferably 1:5 to 1:1 wt % water to glycol are preferred. Typically there will be an excess of ethylene glycol present.

The amount of polyamine used relative to polymer particle is not crucial although there should preferably be an excess of polyamine present.

Activation

To use the surface-treated particles in the preparation of an activated particle, they may be separated from the polyamine reaction medium. This can be achieved by conventional methods, e.g. filtration or sedimentation. Activation of the surface treated polymer particles can then be effected using methods, such as those disclosed in U.S. Pat. No. 6,787,233, before deposition of a coating layer.

The surface active polymer particles are therefore contacted with a catalyst forming material. Suitable catalysts include transition metals in particular Pd, Sn, Pd and Pt or mixtures thereof such as Sn/Pd. Typically, the catalyst is applied in the form of a salt of the catalyst which may be reduced to form metal atom particles if desired.

In a preferred activation step, the surface-treated polymer particles are dispersed in a solution of the salt of a catalyst. This may be mildly heated and stirred. Suitable solutions include aqueous solutions. Any convenient catalyst salt can be used in this stage of the process. The use of halides is preferred, especially chlorides. It is especially preferred if an ammonium salt of the catalyst is used, for example $(NH_4)_2 PdCl_4$.

The amount of catalyst used can vary. Typically a low molarity solution of the catalyst is employed, e.g. $1\times10^{-5}$ to $1\times10^{-3}$ molar. Ideally, there is sufficient catalyst material to produce a complete layer of catalyst on the formed activated polymer particles. The quantity of catalyst can be scaled to accommodate the surface area of the particles to be activated.

The activation step can take place at room temperature, or can involve heating the reaction mixture, for example, at a temperature of at least 40° C. such as in the range of 80-90° C.

As noted above, it is preferred if the catalyst on the activated polymer particles is in the form of the metal atom as opposed to a salt/ion thereof. Where a salt forms an initial polymer particle coating, the surface adsorbed catalyst ions are preferably reduced. For example, reduction can be effected by adding a reducing solution such as dimethylaminoborabe (DMAB). The reduction can be encouraged by mild heating e.g. at temperatures up to 100° C. Pd(II) can be reduced at 60° C. using dimethylaminoborate (DMAB). Any convenient reduction process can be employed.

Without wishing to be limited by theory, it is believed that the efficiency of the activation process depends on the density of catalyst clusters formed on the surface of the polymer particles. This in turn depends on the ability of those particles to bind catalyst. The inventors have found that amine groups are effective binders for the catalyst as amine molecules embedded in the surface during the surface treatment process bind more catalyst ions on the surface than where these are absent. The formation of a larger number of smaller and better distributed catalyst clusters, which is encouraged by the use of a polyamine (as opposed to a diamine) facilitates the deposition of catalyst on the polymer particle surface.

The inventors have surprisingly found that polyamines seem to provide a higher density of amine groups per unit surface area and this encourages smaller catalyst clusters. The polyamine also seems to interact more strongly with functional groups of the polymer particle, in particular those containing epoxy or ester type functional groups. As a result, a larger number of smaller and better distributed catalyst clusters form.

Figure 2:
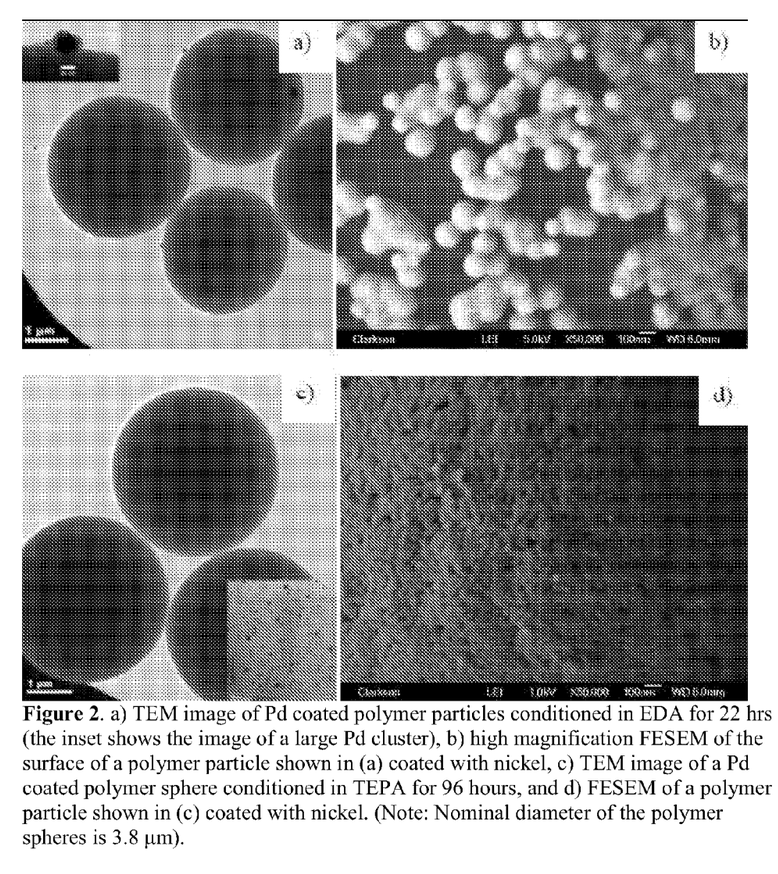
FIG. 2 shows a) TEM image of Pd coated polymer particles conditioned in EDA for 22 hrs (the inset shows the image of a large Pd cluster); b) high magnification FESEM of the surface of a polymer particle shown in (a) coated with nickel; c) TEM image of a Pd coated polymer sphere conditioned in TEPA for 96 hours; and d) FESEM of a polymer particle shown in (c) coated with nickel. (Note: Nominal diameter of the polymer spheres is 3.8 μm).

Thus, large (up to 50 nm) and polydisperse catalyst ion clusters are formed for diamine and non-aminated polymer particles, while in polymer particles which have undergone the surface treatment of the invention the catalyst clusters are much smaller (~4 nm), more uniform and better distributed, as shown in FIG. 2. It is preferred therefore if the catalyst clusters which form in the invention are less than 20 nm in diameter, preferably less than 10 nm in diameter. It is especially preferred if the catalyst clusters are about 5 nm in diameter. Alternatively viewed, the catalyst layer which forms on an activated polymer particle is less than 20 nm in thickness, preferably less than 10 nm thickness. It is especially preferred if the catalyst layer has a thickness of 5 nm or less.

It will be appreciated therefore that these activated polymer particles are distinguishable from particles surface treated using diamines or not surface treated at all and they therefore form a new product per se.

The catalyst clusters act as nucleating sites for the deposition of the metal coating. The size of the coating metal crystallites and hence the structure of the metal coating differs depending on the nature of the catalyst clusters. The small catalyst clusters of the invention allow a more homogeneous and stronger metal coating to form. Again, therefore the metal coated polymer particles of the invention are distinct from those known.

Metal Coating

The surface-treated, activated polymer particles can be coated using conventional coating methods, such as those described in U.S. Pat. No. 6,787,233.

Suitable metal coating layers can be formed from transition metals or a metal such as Bi, Si, Sb, Sn, Pb, Ga, Ge, In or Al or mixtures thereof. Metals of particular interest include gold, chromium, bismuth, indium, zinc and antimony. Especially preferably the metal may be selected from Ni, Cu and Ag, preferably Ni. Mixtures of these metals, e.g. Ni/Cu can also be used.

In particular a lead free solder may be employed in one or more layers of the coating. Lead free solders in commercial use may contain tin, copper, silver, bismuth, indium, zinc, antimony, and traces of other metals. Sn—Ag—Cu solders are especially preferred.

The metal can be provided to the polymer particle as the metal element or as part of a compound, in particular as a salt of the metal such as a halide, and especially an oxide thereof. The metal itself is often formed during the actual coating procedure, e.g. by reduction. This can be achieved using a reducing agent such as DMAB, hydrazine, or hypophosphite.

Preferably the thickness of any coating layer is in the range 25-200 nm. The total thickness of any coating layers may be 25 nm to 5 micron. It is preferred if the total thickness is in the range 25 nm to 2 micron, especially preferably 25 nm to 1 micron.

It is preferred if lead compounds are avoided in the coating.

The surface-treated and activated polymer particles can be further coated according to methods known in the art. Such methods include electroplating, electroless plating, barrel coating, sputtering and vapour deposition. Mixtures of these methods may also be employed.

The coating provided on the particle can be monolayer or multilayer. Preferably the particle comprises a plurality of metal layers. Where multiple coating layers are present it is within the scope of the invention for different coating application methods to be involved in the formation of each layer. In particular, it is preferred if a first layer is introduced using electroless plating and a second layer (and any further layers) introduced using electroplating. Optionally the final layer may be added using electroless plating. It is generally not possible to produce a sufficiently thick coating with good properties using just electroless plating.

Electroless plating is a method of depositing a metal on to a substrate using a process of chemical reduction. The advantage of this type of deposit is that the coating is uniform with hardly any variance in the distribution of thickness across the component.

It may be beneficial to heat-treat the as-deposited electroless plated coating to improve hardness.

Electroplating is a plating process that uses electrical current to reduce cations of a desired metal from a solution and coat an object with a thin layer of the metal. Electroplating can be used to build up coating thickness on a conducting base layer.

In a multilayer coating, it is preferred if the layer adjacent the actual polymer particle comprises nickel, copper or silver, especially silver or nickel. This layer is preferably applied by electroless coating. It is preferred if the top layer comprises Sn, in particular comprises lead free solder, or gold. The top layer is preferably one that resists oxidation. The most preferred top layer is Ag or Au ideally having a thickness in the range 5-2000 nm Preferably the top layer has a thickness in the range 10-100 nm.

A highly preferred structure involves a Ni layer adjacent the polymer particle and a top layer containing, Sn, Ag or Au. Such a polymer particle may have other intermediate layers.

Any intermediate layers preferably comprise copper or nickel. It is obviously beneficial to use as much low-cost metal and as little expensive metal as possible in the invention.

The use of two layers is preferred. It will be appreciated that the different layers can be formed from the same or different metals. If the same metal is used to form multiple layers in may be impossible to distinguish those layers. If layers are indistinguishable then the particle will present simply as having a thicker monolayer made up by multiple depositions. Where the same metal is deposited by different techniques, such layers are often distinguishable.

It will be appreciated that the coating may comprise standard additives such as surface antioxidants if necessary.

The use of polyamines in the surface treatment process has been found to allow the formation of advantageous catalyst containing particles and hence the formation of beneficial metal coated particles. In the case of non-aminated polymer spheres, the inventors have found that after catalyst application and subsequent metal coating, metal atoms precipitated as large nanoparticles having a diameter in the range of 60-80 nm, of which only a small fraction were attached to the polymer surface.

When the polymer particles were conditioned with ethylene diamine, all metal nanoparticles were deposited on the surface of the polymer spheres. However, since their size was still large (~50 nm) the metal shell on the particle was not completely closed. These particles therefore possessed poor properties, for example in terms of mechanical strength.

The use of polyamines having at least three amino groups in the surface treatment step results in the decrease of the size of metal nanoparticles on the particle surface and a smoother, more continuous metal shell. It is preferred therefore if the metal atom clusters on the surface of the polymer particle are less than 40 nm in size.

In a preferred embodiment, it is possible to improve further the quality of the metal coating by controlling the parameters of the plating bath used. It is normal to use a basic plating bath, the pH being adjusted using ammonia. The inventors have found that the amount of ammonia used for the complexation of metal ions strongly affects the kinetics of the reduction of the metal as well as the quality of the deposited metal shell. It is preferred therefore if there is a molar ratio of 1:1.5 to 1:5 in molar ratio of metal ions to ammonia, in particular 1:2 to 1:3 such as about 2.5. This ratio ensures the best reaction kinetics, yield and coating continuity and structure. This forms a further aspect of the invention.

Thus viewed from another aspect the invention provides a process for coating a polymer particle with a metal coating comprising contacting said polymer particle with a plating bath comprising ammonia and metal ions wherein the molar ratio of 1:1.5 to 1:5 in molar ratio of metal ions to ammonia, in particular 1:2 to 1:3 such as about 2.5.

By adjusting the concentration of the metal salt, e.g. simply by dilution, the plating bath can deposit continuous smooth metal shells of different thicknesses. The higher the molar concentration of the metal in the plating bath, the thicker the metal coating layer.

The molar concentration in the plating bath may therefore be typically $1 \times 10^{-3}$ to 0.1 M.

The same effect can be achieved by adjusting the volume of plating liquid. The higher the volume of plating liquid at a given concentration, the thicker the metal coating layer. Adjustment of the volume of liquid rather than the molar concentration of metal can help to avoid effects such as crystallisation or precipitation of components.

The pH in the plating bath is preferably between 9 to 12, especially 10 to 11.

The metal coated polymer particles of the invention are conductive particles and have a wide variety of applications in providing electrical connections, e.g. in printed circuit boards. In particular, the conductive particles of the invention may be used in isotropic or anisotropic conductive materials such as isotropic conductive adhesives (ICA), anisotropic conductive adhesives (ACA), anisotropic conductive films, anisotropic conductive inks etc. that pass electricity along only one axis. The particles can be used in polymer core ball grid array (BGA) applications and in chip scale packaging (CSP). Thus, the particles of the invention have applications in semi-conductor technology, LCD's, chips and so on.

The current process is an effective method to deposit continuous, compact, and smooth metal layers onto polymer particles. The resulting shells are mechanically strong and have a good adherence to the polymer substrate, making the resulting metal/polymer composite particles excellent choices for ACA applications. The ability to control the thickness of the metal shell offers the possibility to control the mechanical properties of the Ni coated polymer spheres and enhanced versatility in regard to the subsequent deposition of a gold shell.

EXAMPLES

Example A

Reagents and Materials:

The monodisperse polymer spheres supplied by Conpart AS (Oslo, Norway) with modal diameters of 3.0 and 3.8 μm and different compositions were prepared according to WO 00/61647 Ammonium tetrachloropalladate [(NH$_4$)$_2$PdCl$_4$], ethylenediamine [EDA], diethylenetriamine [DETA], triethylenetetramine [TETA], tetraethylenepentamine [TEPA], ethyleneglycol [EG], dimethylaminoborane [DMAB], nickel chloride hexahydrate [NiCl$_2$.6H$_2$O], and sodium pyrophosphate [Na$_4$P$_2$O$_7$.10H$_2$O] were all purchased from Alfa Aesar (Ward Hill, Mass.) and used as received. Polyvinylpyrrolidone K30 [M.W. 40,000] was purchased from Fluka Analytical (Milwaukee, Wis.).

Characterization Methods:

The morphology of the particles and coatings was investigated by Field Emission Scanning Electron Microscopy (FESEM) with a Jeol JSM-7400F instrument and Scanning Transmission Electron Microscopy (STEM) using a Jeol JEM-2010 instrument (Jeol Ltd., Japan).

The crystalline structure of the nickel phase was assessed by X-ray diffraction analysis (XRD) using a Bruker D8 Focus diffractometer (Newark, Del.) with the Cu—K$\alpha$1 radiation source (1.5406 Å). The crystallite size of Ni was estimated based on the Schemer equation:

$$d=(k\cdot\lambda)/(\beta \cos \theta)$$

where d is the crystallite size, k is a shape factor (0.9), $\lambda$ is the wavelength of the incident radiation (1.5406 Å), $\beta$ is the peak broadening at half of the intensity, and $\theta$ is the Bragg angle.

The size and size distribution of the uncoated and coated polymer particles was determined with a Malvern Mastersizer 2000s instrument (Westborough, Mass.).

Surface Preparation and Activation of the Polymer Spheres:

Epoxy functionalized polymer particles (5 g) were dispersed in a mixture of 15 cm$^3$ deionized water/30 cm$^3$ polyamine/50 cm$^3$ ethylene glycol in a 4-neck round bottom flask and kept at 110±2° C. under mixing for controlled lengths of time (Table 1).

After separation by filtration, the amine functionalized polymer spheres were activated using the protocol of WO 00/61647. For this purpose, the polymer beads were dispersed in 60 cm$^3$ of aqueous solution of (NH$_4$)$_2$PdCl$_4$ (10$^{-4}$M) and maintained at 85° C. for 30 minutes under continuous mixing. The particles were next washed with deionised water and redispersed in 30 cm$^3$ deionised water. The surface adsorbed Pd(II) species were next reduced at 60° C. by adding 10 cm$^3$ of reducing solution containing 13.5×10$^{-3}$ moles of DMAB.

TABLE 1

Conditions used in the functionalization of the polymer surface.

| Sample # | Polyamine | GMA content/wt. % | Time/hours |
|---|---|---|---|
| A1 | — | 20 | — |
| A2 | EDA | 20 | 22 |
| A3 | DETA | 20 | 22 |
| A4 | TETA | 20 | 22 |
| A5 | TEPA | 20 | 22 |
| A6 | TEPA | 20 | 96 |
| A7 | TEPA | 40 | 96 |

GMA: glycidyl methacrylate in the polymer particle

Deposition of Nickel:

Ni coatings were deposited on the activated polymer beads using a modified version of the electroless plating bath described in U.S. Pat. No. 6,787,233. The experimental parameters used for the optimization of the plating process are given in Table 2 at around pH 10.

TABLE 2

Experimental conditions used for the deposition of Ni coatings

| Sample # | Polymer/ g · dm$^{-3}$ | Ni/ mol · dm$^{-3}$ | NH$_3$:Ni molar ratio | Ni thickness (theoretical/nm) |
|---|---|---|---|---|
| 1 | 10 | 8.4 × 10-2 | 2:1 | 40 |
| 2 | 10 | 8.4 × 10-2 | 2.5:1 | 40 |
| 3 | 10 | 8.4 × 10-2 | 3.5:1 | 40 |
| 4 | 10 | 8.4 × 10-2 | 6:1 | 40 |
| 5 | 10 | 8.4 × 10-2 | 3:1 | 40 |
| 6 | 10 | 16.8 × 10-2 | 3:1 | 80 |
| 7 | 10 | 21.8 × 10-2 | 3:1 | 100 |
| 8 | 10 | 26.6 × 10-2 | 3:1 | 120 |

Figure 1:
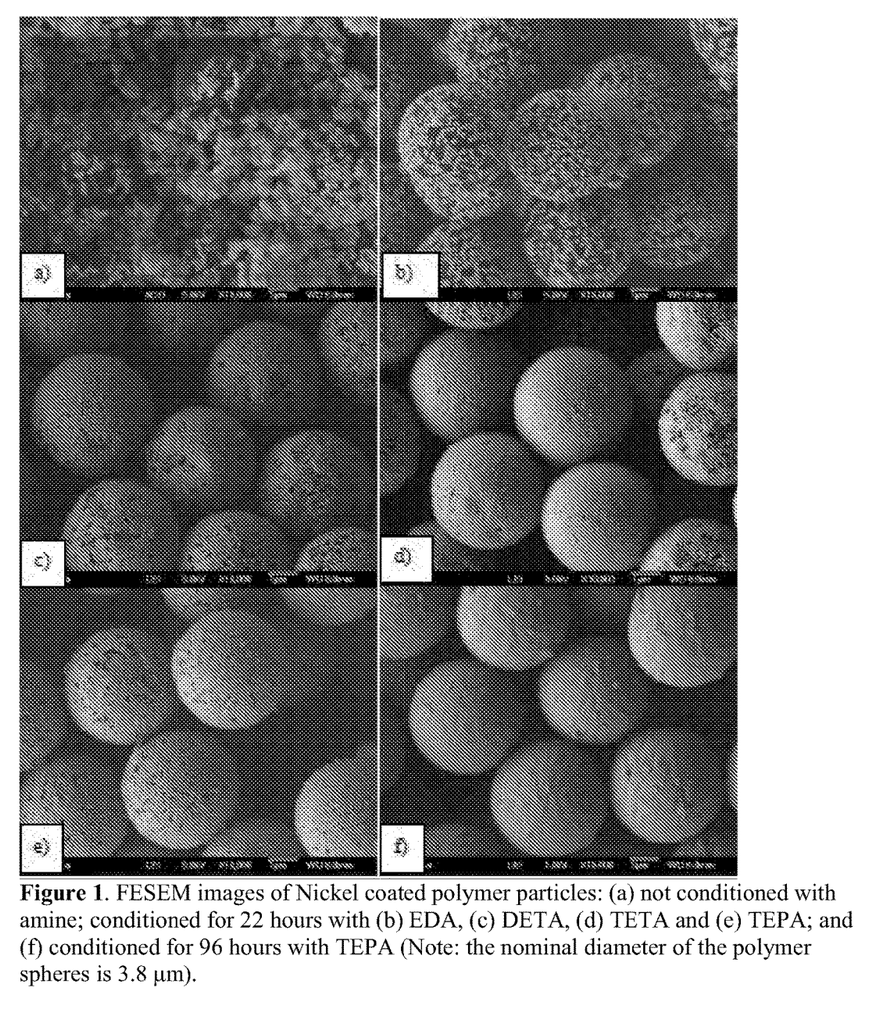
FIG. 1 shows FESEM images of Nickel coated polymer particles: (a) not conditioned with amine; conditioned for 22 hours with (b) EDA, (c) DETA, (d) TETA, and (e) TEPA; and (f) conditioned for 96 hours with TEPA (Note: the nominal diameter of the polymer spheres is 3.8 μm).

Results:

The electron micrographs of Ni coated polymer beads prepared according to the conditions given in Table 1 are shown in FIG. 1.

In the case of non-aminated polymer spheres, Ni precipitated as large (60-80 nm) nanoparticles of which only a small fraction were attached to the polymer surface (FIG. 1a).

When the polymer particles were conditioned with ethylene diamine for 22 hours, all nickel nanoparticles were deposited on the surface of the polymer spheres (FIG. 1b). However, since their size was still large (~50 nm) the nickel shell was not completely closed. The gradual increase in the length of the linear polyamines chain (from DETA to TEPA) resulted in the decrease of the size of Ni nanoparticles and a smoother, more continuous Ni shell (FIG. 1 c-e). In the case of TEPA, extending the contact time with the polymer beads with the amine from 22 to 96 hours further improved the compactness and smoothness of the metallic layer (FIG. 1f).

Without wishing to be limited by theory, it is envisaged that the efficiency of the activation process depends on the density of Pd clusters formed on the surface of the beads. This depends on the ability of the beads to bind Pd(II) ions. Since amine groups are more effective binders than the epoxy functional groups on the surface of the polymer particles, the ethylene diamine molecules imbedded in the surface during the amination process bind more Pd(II) ions on the surface.

The formation of a larger number of smaller and better distributed Pd clusters facilitates the deposition of all Ni on the particle's surface. Polyamines, in particular linear polyamines with longer chains, provide a higher density of amine groups per unit surface and stronger interactions with the epoxy groups of the polymer. As a result, a larger number of smaller and better distributed Pd clusters form with an increased amine molecular weight. Thus, large (up to 50 nm) and polydisperse Pd clusters are formed in the case of ethylene diamine (FIG. 2a), while in the case of the prolonged treatment with TEPA, the Pd clusters are much smaller (~4 nm), more uniform and better distributed (FIG. 2c). Since the Pd clusters act as nucleating sites for the reduction of the base metal, the size of the Ni crystallite and implicitly the structure of the coating differs significantly for the two amines. In the case of ethylene diamine, the shell consisted of much larger Nickel primary particles (~100 nm) (FIG. 2b), whereas in the case of TEPA their average size was only ~30 nm (FIG. 2d). This difference was responsible for the improved continuity and smoothness of the Ni shell in the latter case.

Figure 3:
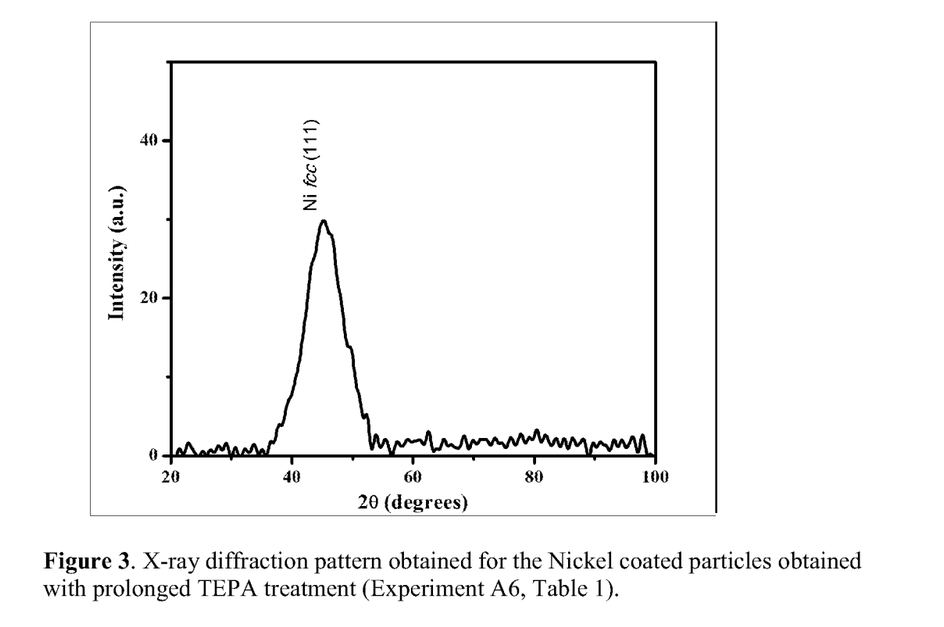
FIG. 3 shows an X-ray diffraction pattern obtained for the Nickel coated particles obtained with prolonged TEPA treatment (Experiment A6, Table 1).

The X-ray diffraction analysis of the coated polymer spheres revealed in all cases a pure crystalline fcc (face centered cubic) nickel phase (FIG. 3). It is noteworthy that the primary particles revealed by FESEM appeared to be polycrystalline, the crystallite depending on the reaction conditions. It the case of the prolonged treatment with TEPA the crystallite size was ~2 nm.

Figure 4:
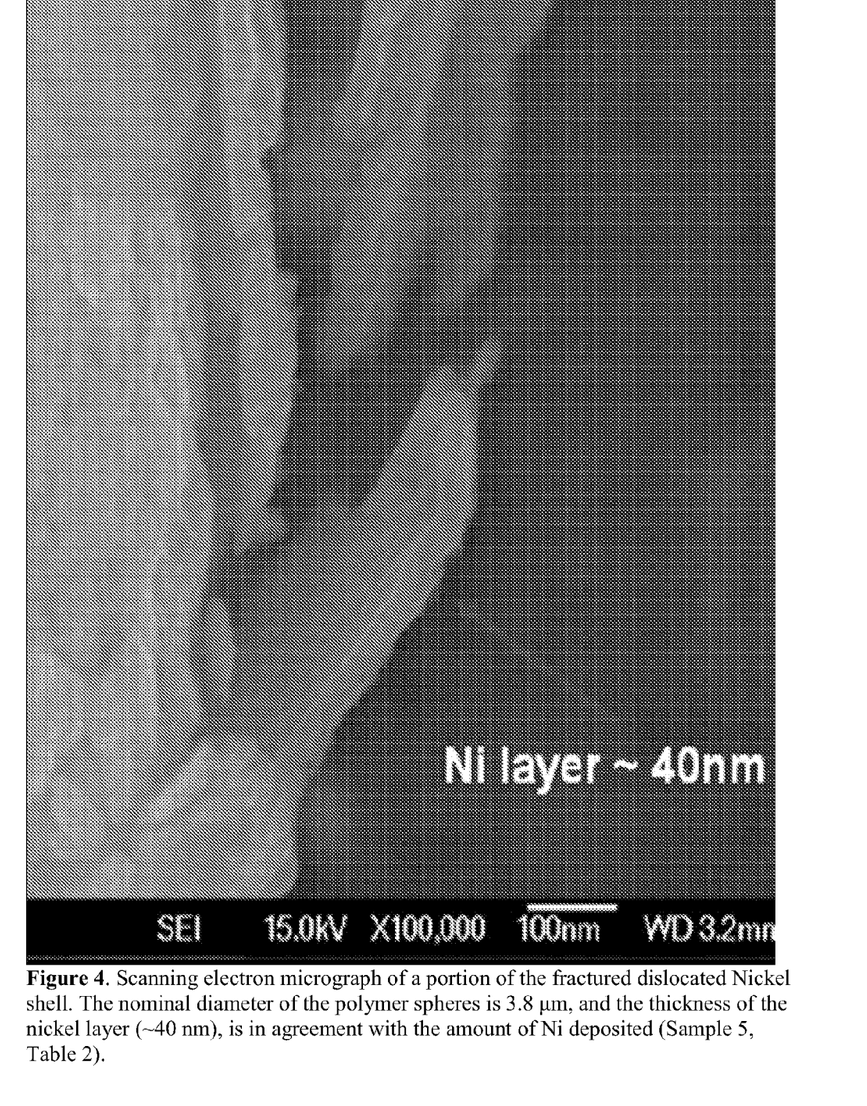
FIG. 4 shows a scanning electron micrograph of a portion of the fractured dislocated Nickel shell. The nominal diameter of the polymer spheres is 3.8 μm, and the thickness of the nickel layer (~40 nm), is in agreement with the amount of Ni deposited (Sample 5, Table 2).

The very small nanocrystallites were fused together forming a compact, mechanically strong, and adhering metallic shell, which required significant force to be fractured and dislocated (FIG. 4).

Figure 5:
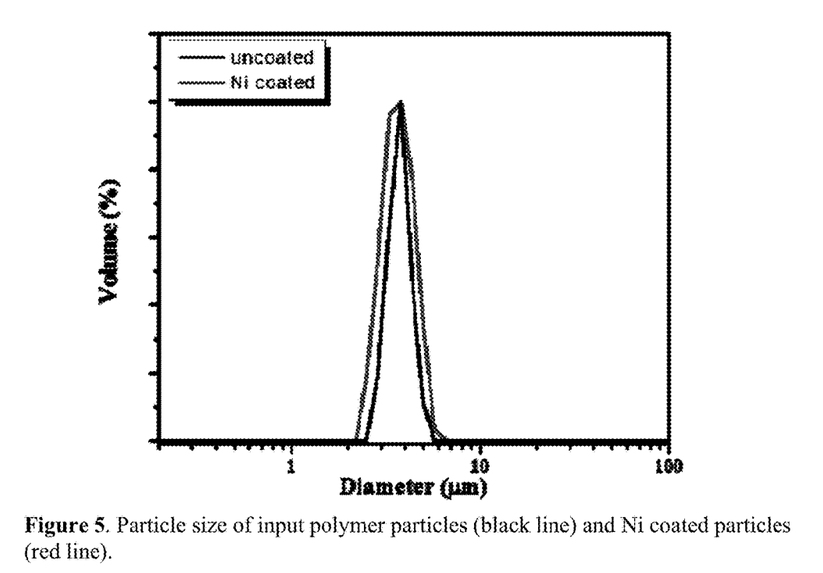
FIG. 5 shows the particle size of input polymer particles (black line) and Ni coated particles (grey line).

As suggested by the FESEM images in FIG. 1(f), the Ni deposition did not result in inter-particle bridging, the particles remaining fully dispersed and non-aggregated through the plating process. This was confirmed by the particle size distribution analysis, which did not exhibit a shift or a broadening for the coated beads when compared with the original polymer spheres (FIG. 5).

Figure 6:
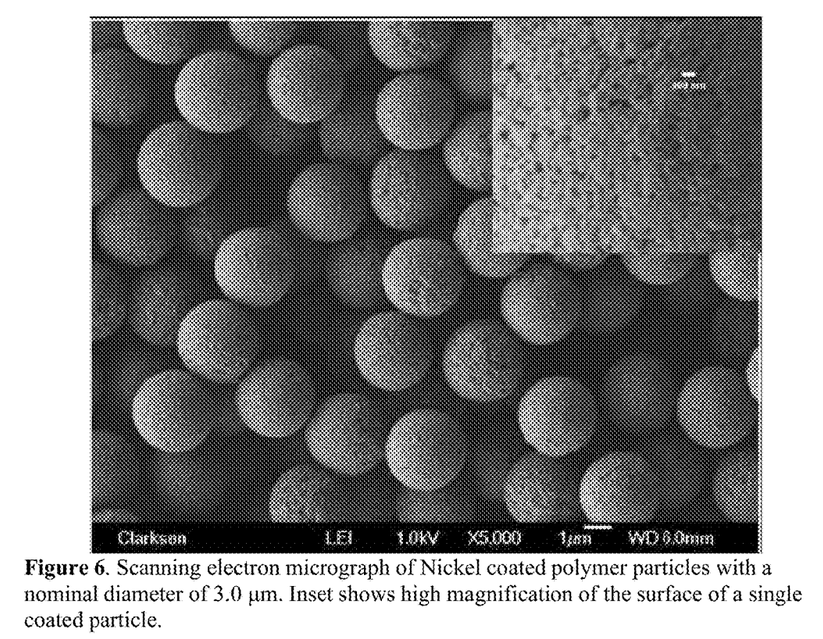
FIG. 6 shows a scanning electron micrograph of Nickel coated polymer particles with a nominal diameter of 3.0 μm. Inset shows high magnification of the surface of a single coated particle.

The plating technique developed was equally effective in providing a continuous, adherent, smooth film on smaller polymer particles. As shown in FIG. 6, the aspect of the coating did not change when decreasing the polymer sphere diameter to 3.0 micrometers from 3.8 micrometers.

Figure 7:
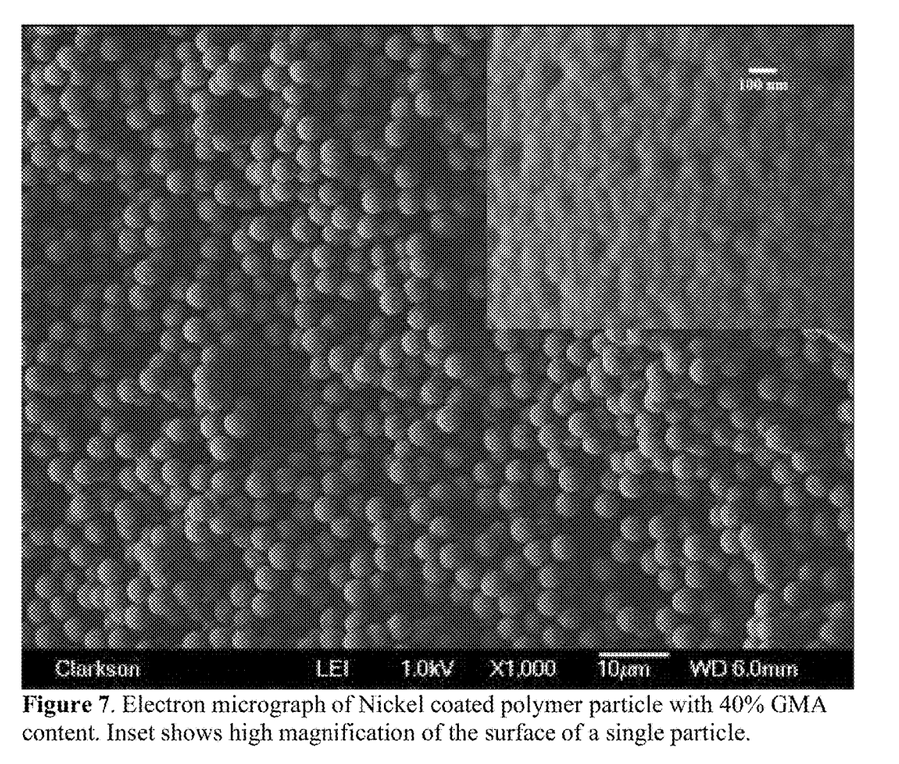
FIG. 7 shows an electron micrograph of Nickel coated polymer particle with 40% GMA content. Inset shows high magnification of the surface of a single particle.

The same coating protocol was successfully applied to core particles having different internal composition (40% glycidyl methacrylate/GMA vs. 20%). The variation in surface functionality of the polymer spheres did not affect the quality of the final nickel shell as indicated by the FESEM images (low and high magnification) in FIG. 7.

The polymer surface treatment with polyamines was a critical factor in ensuring the formation of a continuous, compact and adherent Ni coating.

Figure 8:
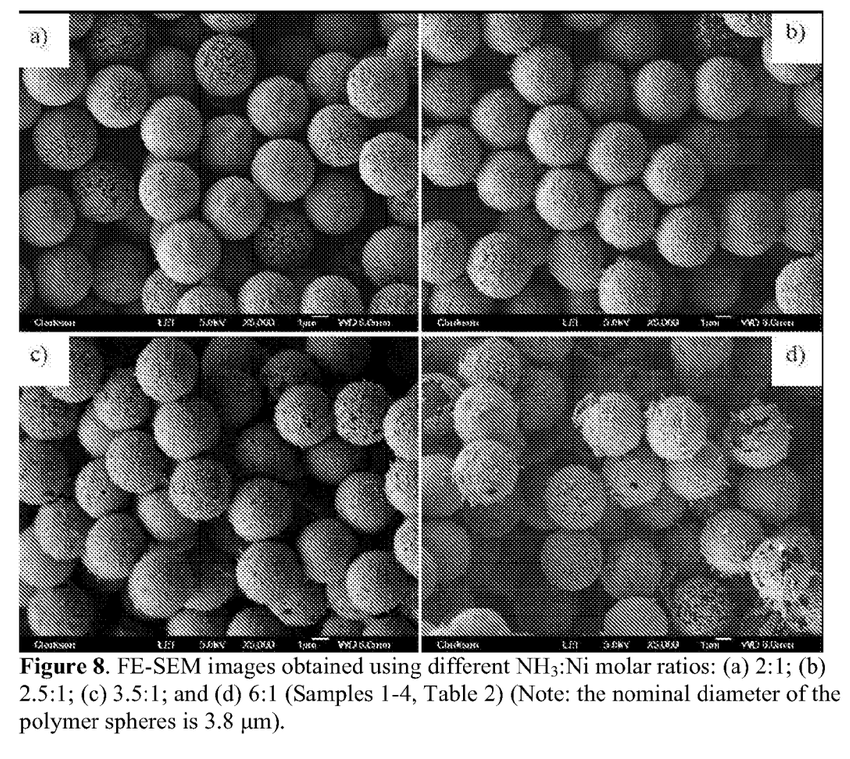
FIG. 8 shows FE-SEM images obtained using different $NH_3$:Ni molar ratios: (a) 2:1; (b) 2.5:1; (c) 3.5:1; and (d) 6:1 (Samples 1-4, Table 2) (Note: the nominal diameter of the polymer spheres is 3.8 μm).

The amount of ammonia ligand used for the complexation of the $Ni^{2+}$ ions affected the kinetics of the reduction of the metal as well as the quality of the deposited Ni shell (Samples 1-4, Table 2). The value of the $Ni^{2+}$/ammonia molar ratio which ensured the best reaction kinetics, yield and coating continuity and structure was 2.5 (FIG. 8).

Figure 9:
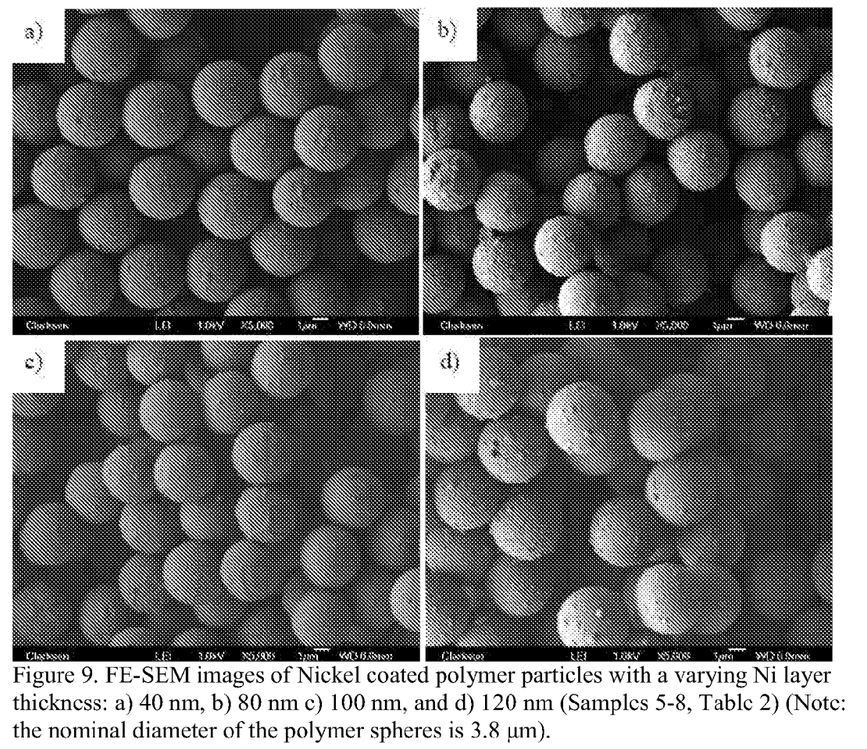
FIG. 9 shows FE-SEM images of Nickel coated polymer particles with a varying Ni layer thickness: a) 40 nm; b) 80 nm; c) 100 nm; and d) 120 nm (Samples 5-8, Table 2) (Note: the nominal diameter of the polymer spheres is 3.8 μm).

By adjusting the concentration of the Ni salt the plating bath described could be used to deposit continuous smooth Ni shells of different thicknesses. FIG. 9 illustrates the ability to control the thickness of the metal layer by gradually increasing the concentration of the Ni salt in the plating bath.

The examples show that the current process is an effective method to deposit continuous, compact, and smooth Ni layers onto monodisperse polymer spheres. The resulting Ni shells are mechanically strong and have a good adherence to the polymer substrate, making the resulting metal/polymer composite particles excellent choices for ACA applications. The ability to control the thickness of the Ni shell offers the possibility to control the mechanical properties of the Ni coated polymer spheres and enhanced versatility in regard to the subsequent deposition of a gold shell.

Example B1

Resorcinol Formaldehyde Particles Treated with Tetraethylenepentamine and Coated with Electroless Nickel The monodisperse polymer spheres supplied by Conpart AS (Oslo, Norway) with modal diameters of 380 µm composed of Resorcinol formaldehyde were produced after the method described in WO 93/02112 and WO 00/61647 Ammonium tetrachloropalladate [$(NH_4)_2PdCl_4$](Sigma), tetraethylenepentamine [TEPA](Sigma), ethyleneglycol [EG](Alfa Aesar), dimethylaminoborane [DMAB](Alfa Aesar), nickel chloride hexahydrate [$NiCl_2.6H_2O$] (Prolabo), Polyvinylpyrrolidone K30 [M.W. 40,000](Prolabo), 25% Ammonia solution (Merck) and sodium pyrophosphate [$Na_4P_2O_7.10H_2O$](Merck) were used as received.

200 g of polymer particles were heated to 200° C. for 2 hour in air. The particles were cooled to room temperature 100 g of the heat treated polymer particles with nominal diameter 380 micrometer were dispersed in a mixture of 125 ml MilliQ water, 124 ml ethylene glycol, and 74 ml tetraethylenepentamine. The mixture was heated to and held at 105° C. for 24 hours. The particles were cooled and washed with Milli-Q water. The particles were redispersed in 1200 ml water and 600 mg tetrachloropalladate added. The particles were heated to 60° C. The particles were washed with Milli-Q water once then redispersed in milli-Q water and heated to 60° C. 1500 mg dimethylaminoborane were added. The particles were stirred for 20 minutes before washing three times with Milli-Q water.

27.5 g of particles (with added catalyst) were added to a mixture of 1500 ml Milli-Q water, 45 g Polyvinylpyrrolidone, and 15 g nickel chloride hexahydrate. 28.4 ml 25% ammonia solution was added. Under rapid agitation 37 ml of a 100 mg/ml solution of dimethylaminoborane was added.

The particles resultant particles were evenly coated with a layer of Nickel showing good adhesion. The thickness of the coating was nominally 1 micrometer.

The particles produced above were barrel-plated with copper using the commercial system "Copper Gleam" of Rohm & Haas, supplied by Candor AB, Sweden. The plating was performed with a total 59.2 Amp hours yielding a nominal thickness of 17.1 micrometer copper. The resultant product showed 100% coverage with an even thickness of copper and good adhesion between copper and the underlying Nickel layer.

Example C1

Treated Acrylate Particles Coated with Silver

The monodisperse polymer spheres Sphereomeres CA30 supplied by Microbeads AS (Skedsmo, Norway) with modal diameters of 28 µm composed of polymethylmethacrylate were produced after the method described in WO 00/61647.

110 g Sphereomeres CA30 were dispersed in 146 g Milli-Q water, 120 ml ethylene glycol and 72 ml tetraethylenepentamine. The mixture was heated to 102° C. and held at this temperature for 24 hours with stirring. The product was washed 3 times with Milli-Q water.

The particles were redispersed in 1320 ml milli-Q water heated to 60° C. and 660 mg Ammonium tetrachloropalladate added. The suspension was held at 60° C. for 25 minutes under stirring. The particles were washed once with Milli-Q water and the product redispersed in 200 ml water. 1650 mg dimethylaminoborane was added and the particles stirred at ambient temperature for 25 minutes. The particles were washed 3 times with Milli-Q water then dried at 70° C. for 12 hours.

8 liters Milli-Q water were pre-heated to 40° C. 27 g Silver Nitrate and 630 ml triethylenetetramine 60% technical grade were added. 90 g of the particles produced above were added and stirred for 1 hour. 54 g Ascorbic acid was added and the particles stirred for 4 hours. The product was dried at 60° C. for 12 hours.

The particles were evenly coated with a layer of Silver showing good adhesion

Example C2

Comparative Example Untreated Particles Coated with Silver

The monodisperse polymer spheres Sphereomeres CA30 supplied by Microbeads AS (Skedsmo, Norway) with modal diameters of 28 μm composed of polymethylmethacrylate were produced after the method described in WO 00/61647.

10 g Sphereomeres CA30 were dispersed in 130 ml milli-Q water heated to 60° C. and 66 mg Ammonium tetrachloropalladate added. The suspension was held at 60° C. for 25 minutes under stirring. The particles were washed once with Milli-Q water and the product redispersed in 20 ml water. 165 mg dimethylaminoborane was added and the particles stirred at ambient temperature for 25 minutes. The particles were washed 3 times with Milli-Q water then dried at 60° C. for 4 hours.

400 ml Milli-Q water was pre-heated to 40° C. 1.35 g Silver Nitrate and 32 ml triethylenetetramine 60% technical grade were added. 4.5 g of the particles produced above were added and stirred for 1 hour. 2.7 g Ascorbic acid was added and the particles stirred for 4 hours. The product was dried at 60° C. for 4 hours.

The particles were only partially covered with Silver and much of the Silver was precipitated as a fine powder.

Example D1

Resorcinol Formaldehyde Particles Coated with Electroless Silver

The monodisperse polymer spheres supplied by Conpart AS (Oslo, Norway) with modal diameters of 390 μm composed of Resorcinol formaldehyde were produced after the method described in WO 93/02112 and WO 00/61647.

200 g of polymer particles were heated to 200° C. for 2 hour in air. The particles were cooled to room temperature 100 g of the heat treated polymer particles with nominal diameter 390 micrometer were dispersed in a mixture of 175 ml MilliQ water, 125 ml ethylene glycol, and 75 ml tetraethylenepentamine. The mixture was heated to and held at 103° C. for 24.5 hours. The particles were cooled and washed with Milli-Q water. The particles were dried.

2.4 g particles were dispersed in 240 ml Milli-Q water and 120 mg tetrachloropalladate added. The particles were heated to 60° C. The particles were stirred for 30 minutes. The particles were washed with Milli-Q water once then redispersed in 70 ml milli-Q water and heated to 60° C. 300 mg dimethylaminoborane were added. The particles were stirred for 30 minutes before washing three times with Milli-Q water. The particles were dried at 60° C. for 14 hours.

A mixture of 85 ml Milli-Q water containing 0.24 g silver nitrate, 5.8 ml triethylenetetramine was warmed to 60° C. 2 g of the particles with added catalyst was added and stirred for 1 hour. 0.5 g ascorbic acid was added. The suspension of particles was stirred for 55 minutes. The product was washed 3 times in Milli-Q water and once in methanol. The product was dried for 10 hours at 60° C.

The product was 100% coated with silver with no apparent material not adhered to the particle.

Comparative Example D2

Untreated Resorcinol Formaldehyde Particles Coated with Electroless Silver

The monodisperse polymer spheres supplied by Conpart AS (Oslo, Norway) with modal diameters of 288 μm composed of Resorcinol formaldehyde were produced after the method described in WO 93/02112 and WO 00/61647.

5 g heat treated particles were dispersed in 60 ml Milli-Q water and 30 mg tetrachloropalladate added. The particles were heated to 60° C. The particles were stirred for 25 minutes. The particles were washed with Milli-Q water once then redispersed in 50 ml milli-Q water and heated to 60° C. 75 mg dimethylaminoborane were added. The particles were stirred for 20 minutes before washing three times with Milli-Q water. The particles were dried at 60° C. for 6 hours.

A mixture of 30 ml Milli-Q water containing 0.1 g silver nitrate, 2.35 ml triethylenetetramine was warmed to 60° C. 1 g of the particles with added catalyst was added and stirred for 1 hour. 0.2 g ascorbic acid was added. The suspension of particles was stirred for 30 minutes. The product was washed 3 times in Milli-Q water and once in methanol. The product was dried for 5 hours at 80° C.

The product was partially covered with silver (estimated only 70% coverage).

The invention claimed is:

1. A process for the preparation of a nickel coated polymer particle comprising
    reacting a polymer particle with at least one polyamine, wherein said polymer particle comprises an acrylate and/or a methacrylate seed, wherein said polyamine is a linear polyamine having 4-6 amino groups, to form a surface treated polymer particle, wherein said polyamine is on the surface of the surface treated polymer particle;
    applying a catalyst to the surface treated polymer particle to form an activated polymer particle wherein the catalyst is bound to said amino groups; and
    applying at least one nickel coating to said activated polymer particle to form a nickel coated polymer particle.

2. The process of claim 1, wherein said nickel coating is applied using a plating bath comprising ammonia and nickel ions wherein the molar ratio of 1:1.5 to 1:5 in molar ratio of nickel ions to ammonia.

3. The process of claim 1, wherein the catalyst is Pd, Pt or Sn or mixtures thereof.

4. The process of claim 1, wherein said nickel coating layer is deposited by at least one of electroless plating or electroplating.

5. The process of claim 1, wherein said polymer particle is cross-linked.

6. The process of claim 1, wherein said polymer particle comprises a phenol/aldehyde polymer or an epoxy functional polymer.

7. The process of claim 1, wherein said polymer particle does not contain a polyester.

8. The process of claim 1, wherein reaction of said polyamine with said polymer particle does not involve formation of an amide group.

9. The process of claim 2, wherein the ratio of nickel ions to ammonia is 1:2 to 1:3.

10. The process of claim 2, wherein the ratio of nickel ions to ammonia is 1:2.5.

* * * * *